United States Patent
Suresh et al.

(10) Patent No.: US 12,547,759 B2
(45) Date of Patent: Feb. 10, 2026

(54) PRIVACY PRESERVING MACHINE LEARNING MODEL TRAINING

(71) Applicant: Google LLC, Mountain View, CA (US)

(72) Inventors: Ananda Theertha Suresh, New York, NY (US); Xinnan Yu, New York, NY (US); Sanjiv Kumar, Jericho, NY (US); Sashank Jakkam Reddi, Jersey City, NJ (US); Venkatadheeraj Pichapati, La Jolla, CA (US)

(73) Assignee: Google LLC, Mountain View, CA (US)

( * ) Notice: Subject to any disclaimer, the term of this patent is extended or adjusted under 35 U.S.C. 154(b) by 1137 days.

(21) Appl. No.: 16/994,396

(22) Filed: Aug. 14, 2020

(65) Prior Publication Data

US 2021/0049298 A1 Feb. 18, 2021

Related U.S. Application Data

(60) Provisional application No. 62/886,889, filed on Aug. 14, 2019.

(51) Int. Cl.

| | |
|---|---|
| *G06F 17/17* | (2006.01) |
| *G06F 18/21* | (2023.01) |
| *G06F 18/214* | (2023.01) |
| *G06F 21/62* | (2013.01) |
| *G06N 3/04* | (2023.01) |
| *G06N 3/084* | (2023.01) |
| *G06V 10/774* | (2022.01) |
| *G06V 10/778* | (2022.01) |

(52) U.S. Cl.
CPC .......... *G06F 21/6245* (2013.01); *G06F 17/17* (2013.01); *G06F 18/2148* (2023.01); *G06F 18/2193* (2023.01); *G06N 3/04* (2013.01); *G06N 3/084* (2013.01); *G06V 10/7747* (2022.01); *G06V 10/7796* (2022.01)

(58) Field of Classification Search
CPC ........ G06N 3/08; G06N 3/045; G06N 3/0895; G06N 3/09; G06N 3/091; G06N 3/092; G06N 3/094; G06N 3/096; G06N 3/098; G06N 3/0985; G06N 3/0455; G06N 3/04; G06N 3/0464; G06N 3/0475; G06N 3/0495; G06N 3/0499; G06N 3/084; G06F 21/6245; G06F 17/17; G06F 18/214

See application file for complete search history.

(56) References Cited

U.S. PATENT DOCUMENTS

| | | | |
|---|---|---|---|
| 11,449,639 B2 * | 9/2022 | Bernau | G06F 21/6254 |
| 2017/0140264 A1 * | 5/2017 | Sutskever | G06N 3/044 |
| 2018/0268283 A1 * | 9/2018 | Gilad-Bachrach | G06F 17/18 |
| 2019/0147298 A1 * | 5/2019 | Rabinovich | G06N 3/045 |
| | | | 382/157 |

(Continued)

OTHER PUBLICATIONS

Dwork et al., "The Algorithmic Foundations of Differential Privacy," Foundations and Trends® in Theoretical Computer Science, vol. 9, Nos. 3-4, pp. 1-277 (2013) (Year: 2013).*

(Continued)

*Primary Examiner* — Brian M Smith
*Assistant Examiner* — Kevin L. Smith
(74) *Attorney, Agent, or Firm* — Fish & Richardson P.C.

(57) ABSTRACT

Methods, systems, and apparatus, including computer programs encoded on computer storage media, for privacy preserving training of a machine learning model.

20 Claims, 3 Drawing Sheets

(56) References Cited

U.S. PATENT DOCUMENTS

| | | | |
|---|---|---|---|
| 2019/0188402 A1* | 6/2019 | Wang | G06N 7/01 |
| 2020/0184106 A1* | 6/2020 | Santana de Oliveira | G06F 21/6254 |
| 2020/0311520 A1* | 10/2020 | Zhao | G06V 10/764 |
| 2021/0209247 A1* | 7/2021 | Mohassel | A63B 21/023 |

OTHER PUBLICATIONS

Garcia et al., "Semantic Noise: Privacy-Protection of Nominal Microdata through Uncorrelated Noise Addition," IEEE (2015) (Year: 2015).*

Abadi et al., "Deep Learning with Differential Privacy," arXiv (2016) (Year: 2016).*

McMahan et al., "Learning Differentially Private Recurrent Language Models," arXiv (Feb. 2018) (Year: 2018).*

Xiping Liu, "Distributed Variational Inference and Privacy," University of Cambridge (Aug. 12, 2019) (Year: 2019).*

Zhang et al., "Analysis of Gradient Clipping and Adaptive Scaling with a Relaxed Smoothness Condition," arXiv (May 2019) (Year: 2019).*

Veen et al., "Three Tools for Practical Differential Privacy," arXiv (2018) (Year: 2018).*

Xiping Liu, "Distributed Variational Inference and Privacy," University of Cambridge (Aug. 12, 2019, Thesis) (Year: 2019).*

Truex et al., "A Hybrid Approach to Privacy-Preserving Federated Learning," arXiv (2018) (Year: 2018).*

Abadi et al., "Deep learning with differential privacy", arXiv:1607.00133v2, Oct. 2016, 14 pages.

Agarwal et al., "cpSGD: Communication-efficient and differentially-private distributed SGD", Advances in Neural Information Processing Systems, 2018, pp. 7564-7575.

Barak et al., "Privacy, accuracy, and consistency too: A holistic solution to contingency table release", Proceedings of the 26th ACM SIDMOD-SIDACT-SIGART Symposium on Principles of Database Systems, 2007, pp. 273-282.

Bassily et al., "Differentially private empirical risk minimization: Efficient algorithms and tight error bounds", arXiv:1405.7085v2, Oct. 2014, 39 pages.

Bonawitz et al., "Practical secure aggregation for privacy preserving machine learning", Proceedings of the 2017 ACM SIGSAC Conference on Computer and Communications Security, 2017, pp. 1175-1191.

Bun et al., "Concentrated differential privacy: Simplifications extensions, and lower bounds", Theory of Cryptography Conference, 2016, pp. 635-658.

Chaudhuri et al., "Differentially private empirical risk minimization", Journal of Machine Learning Research, 2011, 12(Mar.):1069-1109.

Chaudhuri et al., "Privacy-preserving logistic regression", Advances in Neural Information Processing Systems, 2009, pp. 289-296.

Chaudhuri et al., "When random sampling preserves privacy", Annual International Cryptologu Conference, 2006, pp. 198-213.

Duchi et al., "Adaptive subgradient methods for online learning and stochastic optimization", Journal of Machine Learning Research, 2011, 12(Jul.):2121-2159.

Duchi et al., "Local privacy and statistical minimax rates", 2013 IEEE 54th Annual Symposium on Foundations of Computer Science, pp. 429-438.

Dwork et al., "Boosting and differential privacy", 2010 IEEE 51st Annual Symposium on Foundations of Computer Science, 2010, pp. 51-60.

Dwork et al., "Calibrating noise to sensitivity in private data analysis", Theory of Cryptography Conference, 2006, pp. 265-284.

Dwork et al., "Differential privacy and robust statistics", Proceedings of the 41st Annual ACM Symposium on Theory of Computing, 2009, pp. 371-380.

Dwork et al., "Our data, ourselves: Privacy via distributed noise generation", Annual International Conference on the Theory and Applications of Cryptographic Techniques, 2006, pp. 486-503.

Dwork et al., "The algorithmic foundations of differential privacy", Foundations and Trends in Theoretical Computer Science, 2014, 9(3-4):211-407.

Ellenberg, "The Netflix Challenge", Wired-San Francisco, 2008, 16(3):114.

Geng et al., "The optimal noise-adding mechanism in additive differential privacy", arXiv:1809.10224, 10 pages.

Geng et al., "The optimal noise-adding mechanism in differential privacy", IEEE Transactions on Information Theory, 2016, 62(2):925-951.

Hard et al., "Federated learning for mobile keyboard prediction", arXiv:1811.03604v2, Feb. 2009, 7 pages.

He et al., "Delving deep into rectifiers: Surpassing human-level performance on imagenet classification", Proceedings of the IEEE International Conference on Computer Vision, 2015, pp. 1026-1034.

Kairouz et al., "The composition theorem for differential privacy", IEEE Transactions on Information Theory, 2017, 63(6):4037-4049.

Kingma et al., "ADAM: A method for stochastic optimization", arXiv: 1412.6980v9, Jan. 2017, 15 pages.

Krizhevsky et al., "Imagenet classification with deep convolutional neural networks", Advances in Neural Information Processing Systems, 2012, pp. 1097-1105.

Kumar et al., "Lattice rescoring strategies for long short term memory language models in speech recognition", arXiv:1711.05448v1, Nov. 2017, 8 pages.

LeCun et al., "Gradient based learning applied to document recognition", Proceedings of the IEEE, Nov. 1998, 86(11):2278-2324.

McMahan et al., "Learning differentially private recurrent language models", arXiv:1710.06963v3, Feb. 2018, 14 pages.

McSherry et al., "Mechanism design via differential privacy", 48th Annual IEEE Symposium on Foundations of Computer Science, 2007, pp. 94-103.

McSherry et al., "Privacy integrated queries: an extensible platform for privacy-preserving data analysis", Proceedings of the 2009 ACM SIGMOD International Conference on Management of Data, pp. 19-30.

Mikolov et al., "Recurrent neural network based language modeling in meeting recognition", Eleventh Annual Conference of the International Speech Communication Association, 2010, 4 pages.

Polyak et al., "Some methods of speeding up the convergence of iteration methods", USSR Computational mathematics and Mathematical Physics, 1964, 4(5):1-17.

Reddi et al., "Stochastic variance reduction for nonconvex optimization", International Conference on Machine Learning, 2016, pp. 314-323.

Rubinstein et al., "Learning in a large function space: Privacy-preserving mechanisms for SVM learning", arXiv: 0911.52708v1, Nov. 2009, 21 pages.

Shokri et al., "Privacy-preserving deep learning", Proceedings of the 22nd ACM SIGSAC Conference on Computer and Communications Security, 2015, pp. 1310-1321.

Vinyals et al., "Grammar as a foreign language", Advances in Neural Information Processing Systems, 2015, pp. 2773-2781.

Wu et al., "Bolt-on differential privacy for scalable stochastic gradient descent-based analytics", arXiv:1606.04722v3, Mar. 2017, 29 pages.

Zhang et al., "Differentially private releasing via deep generative model (technical report)", arXiv:1801.01594v2, Mar. 2018, 12 pages.

Zhang et al., "Functional Mechanism: Regression analysis under differential privacy", arXiv:1208.0219v1, Aug. 2012, 12 pages.

* cited by examiner

PRIVACY PRESERVING MACHINE LEARNING MODEL TRAINING

CROSS-REFERENCE TO RELATED APPLICATION

This application claims priority to U.S. Provisional Application No. 62/886,889, filed on Aug. 14, 2020. The disclosure of the prior application is considered part of and is incorporated by reference in the disclosure of this application.

BACKGROUND

This specification relates to training machine learning models, e.g., neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that trains a machine learning model, e.g., a neural network, to perform a particular task. In particular, the system trains the machine learning model on training data that includes user data from multiple users in a manner that preserves the privacy of the users.

Particular embodiments of the subject matter described in this specification can be implemented so as to realize one or more of the following advantages.

By training machine learning models on training data that is derived from user data as described in this specification, the system can train a machine learning model to perform well on any of a variety of machine learning tasks while maintaining the privacy of the users from whom the training data was derived.

In particular, the system can train the machine learning model to have improved performance on any of a variety of machine learning tasks relative to other training mechanisms that preserve the privacy of user data while still maintaining privacy equally as well or better than the conventional techniques.

By determining privacy preserving noisy gradients for each model parameter using coordinate-wise, i.e., per-parameter, adaptive clipping, the system is able to add less noise to the gradient for each model parameter while still maintaining user privacy. Adding less noise to gradients during training results in the model performing better after training. Additionally, adding less noise to gradients can result in faster convergence of the model parameters, decreasing the amount of time and computational resources required to train the model. More specifically, the system achieves this adaptive clipping by, for each parameter, modifying the respective gradient for the model parameter based on (i) a mean noisy gradient estimate for the model parameter and (ii) a standard deviation noisy gradient estimate for the model parameter. These estimates are repeatedly updated during training, resulting in a scheme that is both adaptive and coordinate-wise.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
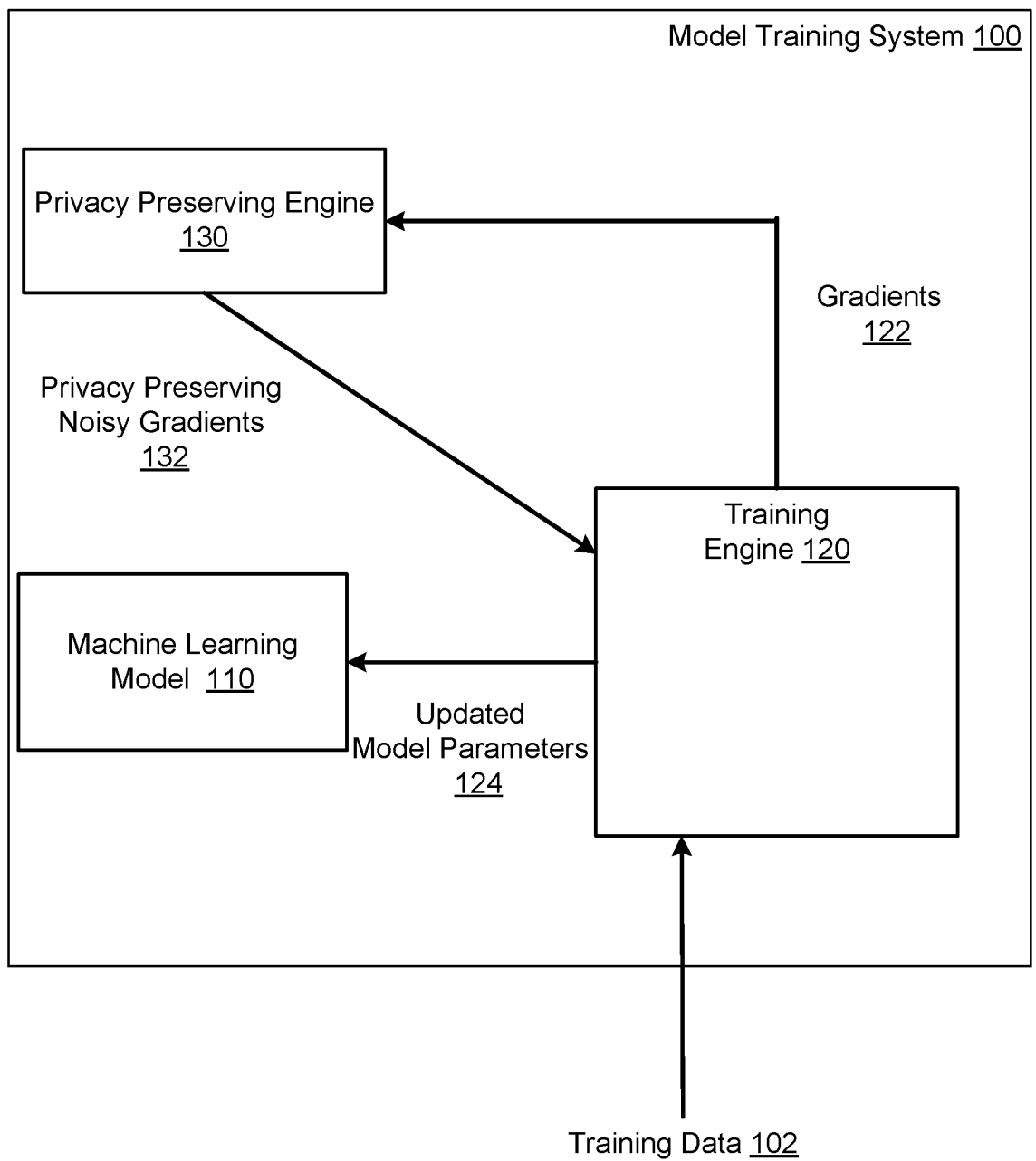
FIG. 1 shows an example model training system.

This specification describes a system implemented as computer programs on one or more computers in one or more locations that trains a machine learning model that is configured to perform a particular machine learning task.

The machine learning model can be trained to perform any kind of machine learning task, i.e., can be configured to receive any kind of digital data input and to generate any kind of score, classification, or regression output based on the input.

In some cases, the machine learning model is a neural network that is configured to perform an image processing task, i.e., receive an input image and to process the input image to generate a model output for the input image. For example, the task may be image classification and the output generated by the machine learning model for a given image may be scores for each of a set of object categories, with each score representing an estimated likelihood that the image contains an image of an object belonging to the category. As another example, the task can be image embedding generation and the output generated by the machine learning model can be a numeric embedding of the input image. As yet another example, the task can be object detection and the output generated by the machine learning model can identify locations in the input image at which particular types of objects are depicted. As yet another example, the task can be image segmentation and the output generated by the machine learning model can assign each pixel of the input image to a category from a set of categories.

As another example, if the inputs to the machine learning model are Internet resources (e.g., web pages), documents, or portions of documents or features extracted from Internet resources, documents, or portions of documents, the task can be to classify the resource or document, i.e., the output generated by the machine learning model for a given Internet resource, document, or portion of a document may be a score for each of a set of topics, with each score representing an estimated likelihood that the Internet resource, document, or document portion is about the topic.

As another example, if the inputs to the machine learning model are features of an impression context for a particular advertisement, the output generated by the machine learning model may be a score that represents an estimated likelihood that the particular advertisement will be clicked on.

As another example, if the inputs to the machine learning model are features of a personalized recommendation for a user, e.g., features characterizing the context for the recommendation, e.g., features characterizing previous actions taken by the user, the output generated by the machine learning model may be a score for each of a set of content items, with each score representing an estimated likelihood that the user will respond favorably to being recommended the content item.

As another example, if the input to the machine learning model is a sequence of text in one language, the output generated by the machine learning model may be a score for each of a set of pieces of text in another language, with each score representing an estimated likelihood that the piece of text in the other language is a proper translation of the input text into the other language.

As another example, the task may be an audio processing task. For example, if the input to the machine learning model is a sequence representing a spoken utterance, the output generated by the machine learning model may be a score for each of a set of pieces of text, each score representing an estimated likelihood that the piece of text is the correct transcript for the utterance. As another example, the task may be a keyword spotting task where, if the input to the machine learning model is a sequence representing a spoken utterance, the output generated by the machine learning model can indicate whether a particular word or phrase ("hotword") was spoken in the utterance. As another example, if the input to the machine learning model is a sequence representing a spoken utterance, the output generated by the machine learning model can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the model output is a spectrogram or other data defining audio of the text being spoken in the natural language.

As another example, the task can be a health prediction task, where the input is electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be an agent control task, where the input is an observation characterizing the state of an environment and the output defines an action to be performed by the agent in response to the observation. The agent can be, e.g., a real-world or simulated robot, a control system for an industrial facility, or a control system that controls a different kind of agent.

Many of these tasks require the machine learning model to be trained on user data, i.e., data that is provided by a user, e.g., a label for an image that is provided by the user, data that is specific to a particular user, e.g., text written by a particular user or a medical record of a user, or that is generated as a result of user interaction with a system, e.g., search queries submitted by the user to a search engine or an interaction or selection history for a user that is based on interactions with content items by the user.

This user data can include sensitive information that users may not wish to make public, e.g., data from typing histories, social networks, financial records, or medical records, and that users may not wish to be made transparent through predictions made by the model.

Accordingly, the system trains the machine learning model in a manner that preserves the privacy of each of the users from which the training data for the model is derived. In particular, the system trains the machine learning model so that the outputs generated by the trained machine learning model are, to a specified degree, indistinguishable whether or not any given user's training data is included in the training data for the model. That is, the system performs the training such that, for any given user associated with any data in the training data set, outputs generated by the trained model are, to a specified degree, indistinguishable between the model being trained on (i) the entire training data set minus the data associated with the user or (ii) the entire training data set. The system accomplishes this by, for each batch of training examples that is used during training, determining respective privacy preserving gradients for each model parameter and using these privacy preserving gradients to update the model parameters.

In some implementations, user data may be treated in one or more ways before it is stored or used for training the machine learning model, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined.

FIG. 1 shows an example model training system 100. The model training system 100 is an example of a system implemented as computer programs on one or more computers in one or more locations, in which the systems, components, and techniques described below can be implemented.

The model training system 100 is a system that obtains training data 102 for training a machine learning model 110 to perform a particular task. The training data 102 includes user data, i.e., at least some of the training examples in the training data 102 are derived from users, i.e., are generated from data that is provided by a user, data that is specific to a particular user, or data that is generated as a result of user interaction with a system.

Generally, the training data 102 includes a set of training examples, with each training example including a training input and, for each training input, a respective target output that should be generated by the machine learning model to perform the particular task.

The system 100 can receive the training data 102 in any of a variety of ways. For example, the system 100 can receive training data as uploads from users of the system over a data communication network, e.g., using an application programming interface (API) made available by the system 100. As another example, the system 100 can receive an input from a user specifying which data that is already maintained by the system 100 should be used for training the machine learning model.

The machine learning model 110 is a model, e.g., a neural network, having a set of parameters ("model parameters") and that is configured to process model inputs in accordance with the model parameters to generate an output for the particular task.

The machine learning model 110 can have any appropriate architecture that allows the model 110 to receive model inputs of the type required by the particular task and to generate model outputs of the form required for the particular task. Examples of machine learning models 110 that can be trained by the system 100 include fully-connected neural networks, convolutional neural networks, recurrent neural networks, attention-based neural networks, e.g., Transformers, and so on.

Generally, a training engine 120 within the system 100 trains the machine learning model 110 on the training data 102 over multiple training steps using an iterative gradient descent training technique.

In a typical gradient descent training technique, at each training step, the training engine 120 would compute respective gradients 122 of an objective function with respect to each of the model parameters and on a batch of training examples selected from the training data 102, apply a learning rate to the computed gradients 122 to determine a parameter value update, and then apply the parameter value update to the current values of the model parameters of the machine learning model, i.e., by subtracting or adding the parameter value update with the current parameter values.

However, training the machine learning model in this manner may not result in the privacy of the users that provided the user data being preserved. For example, information related to a given user may be recoverable from the trained model because the model output for any given model input may be different depending on whether the given user's data was included in the training data or not.

Therefore, instead of directly using the gradients 122 to update the model parameters, at each iteration of the training process a privacy preserving engine 130 within the system 100 first applies coordinate-wise, i.e., per-parameter, adaptive clipping to each gradient 122 to determine respective privacy preserving noisy gradients 132 for each of the model parameters.

The training engine 120 then updates the model parameters, i.e., determines updated model parameters 124, based on the privacy preserving noisy gradients 132 instead of directly using the gradients 122.

Computing the privacy preserving noisy gradients 132 and using the privacy preserving gradients to update the model parameters is described in more detail below with reference to FIGS. 2 and 3.

By repeatedly performing training steps, the training engine 120 repeatedly updates the values of the model parameters to improve the performance of the machine learning model 110 on the particular task.

The manner in which the training engine 120 determines the parameter value update, i.e., how the training engine 120 applies the learning rate to any given privacy preserving noisy gradient 132, is dependent on the optimizer that is being used in the training.

For example, in stochastic gradient descent, the update is a product of the learning rate and the gradient.

As another example, in the Adam optimizer, the update is a product of the learning rate and an exponentially decayed average of past gradients.

As another example, in the Adagrad optimizer, the system first adapts the learning rate per weight, i.e., per model parameter, based on the sums of the squares of the gradients and then computes, for each model parameter, a product of the gradient with respect to the parameter and the adapted learning rate.

In some implementations, after the machine learning model 110 has been trained, the system 100 deploys the trained machine learning model and then uses the trained model to process requests received from users, e.g., through the API provided by the system. In other words, after training, the system uses the trained machine learning model 110 to generate new model outputs for new model inputs.

Instead of or in addition to using the trained machine learning model 110, the system 100 can provide data specifying the final model parameter values to a user who submitted a request to train the machine learning model or to the users from whom the training data was derived, e.g., through the API.

Figure 2:
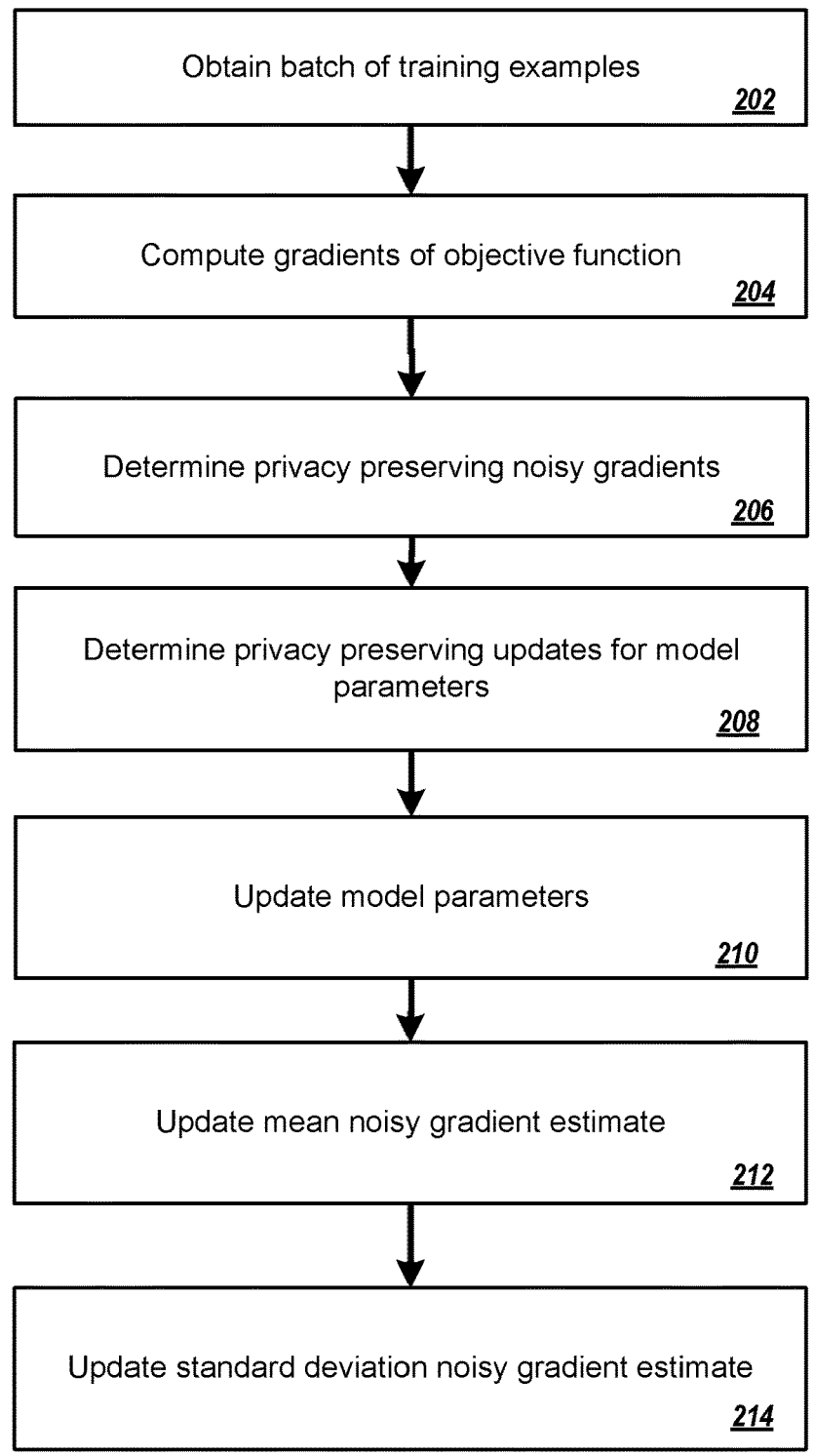
FIG. 2 is a flow diagram of an example process for training the machine learning model.

FIG. 2 is a flow diagram of an example process 200 for training the machine learning model. For convenience, the process 200 will be described as being performed by a system of one or more computers located in one or more locations. For example, a model training system, e.g., the model training system 100 of FIG. 1, appropriately programmed, can perform the process 200.

The system can repeatedly perform the process 200 on different batches of training data to determine trained values of the model parameters, i.e., by repeatedly updating the current values of the model parameters. For example, the system can continue performing the process 200 until a threshold number of iterations of the process have been performed, until a threshold amount of time has elapsed, or until the values of the model parameters have converged.

Prior to performing the process 200, the system initializes the model parameters and, for each model parameter, a respective mean noisy gradient estimate and a respective standard deviation noisy gradient estimate.

The system can initialize the model parameters using a machine learning parameter initialization technique, e.g., random initialization.

As will be described in more detail below, the system will use the mean noisy gradient estimates and the standard deviation noisy gradient estimates when adaptively clipping gradients to update the model parameters during training of the model.

As a particular example, the system can initialize the mean noisy gradient estimate for each of the model parameters to a fixed value, e.g., zero.

As another particular example, the system can initialize the standard deviation noisy gradient estimate for each of the model parameters based on predetermined maximum and minimum values for the standard deviation of the noisy gradients for the model parameters. For example, the system can initialize the standard deviation noisy gradient estimate for each of the model parameters to be equal to the square root of the product of the predetermined maximum value and the predetermined minimum value. These predetermined maximum and minimum values will then be used when updating the standard deviation noisy gradient estimate to ensure that the estimate stays remains within the range defined by these values.

The system obtains a batch of training examples, i.e., a plurality of training examples that include user data from multiple different users (step 202). For example, each training example in the batch can be derived from a different user.

The system computes, for each of the training examples and for each of the model parameters, a respective gradient of an objective function with respect to the model parameter (step 204). The objective function can be any appropriate objective function for the particular task that the model is being trained to perform and generally measures errors between an output generated by the machine learning model for a training input and a target output that should have been generated by the machine learning model for the training input. Examples of objective functions that may be appropriate for various tasks include cross-entropy losses, mean squared error losses, L2 distance losses, log likelihood objectives, and so on. Thus, for any given model parameter, the system computes a respective gradient for each training example in the batch.

The system determines, for each of the training examples and for each of the model parameters, a respective privacy preserving noisy gradient (step 206).

In particular, for a given training example and a given model parameter, the system modifies the respective gradient for the model parameter based on (i) the mean noisy gradient estimate for the model parameter and (ii) the standard deviation noisy gradient estimate for the model parameter to generate a privacy preserving noisy gradient.

Generally, to perform the modification, the system adaptively clips the respective gradient for the model parameter based on (i) the mean noisy gradient estimate for the model parameter and (ii) the standard deviation noisy gradient estimate for the model parameter and then adds noise to the adaptively clipped gradient.

Performing this modification is described in more detail below with reference to FIG. 3.

The system determines, for each of the model parameters, a respective privacy preserving update for the model parameter from the privacy preserving noisy gradients for the model parameter for the plurality of training examples (step 208).

To determine the privacy preserving update for a given model parameter, the system computes an average noisy gradient for the given model parameter by averaging the privacy preserving noisy gradients for the model parameter for the plurality of training examples.

For each model parameter, the system then applies a current learning rate to the average noisy gradient to generate the privacy preserving update for the model parameter. As described above, the manner in which the system generates the privacy preserving update will depend on the optimizer that is being used for the training.

For example, in stochastic gradient descent the system can multiply the gradient by the current learning rate to generate the update.

As another example, when using the Adam optimizer the system can determine a modified gradient based on the current gradient and one or more recently computed gradients and then multiply the modified gradient by the current learning rate to generate the update.

The system updates the model parameters based on the privacy preserving updates (step 210). For example, the system can, for each model parameter, subtract the privacy preserving update for the model parameter from the model parameter to generate an updated model parameter.

The system updates the mean noisy gradient estimate for each of the plurality of model parameters (step 212).

In particular, the system updates the mean noisy gradient estimate for the model parameter based on the privacy preserving noisy gradients for the model parameter by interpolating between the mean noisy gradient estimate and the average privacy preserving noisy gradient for the model parameter for the plurality of training examples in accordance with a mean interpolation weight hyperparameter.

That is, the system the updated mean noisy gradient estimate is an interpolation between (i) the currently maintained mean noisy gradient estimate and (ii) the average privacy preserving noisy gradient for the model parameter for the plurality of training examples, where the weight assigned to (i) and (ii) in the interpolation is governed by a mean interpolation weight hyperparameter that defines how quickly the estimate changes during the training.

The system updates the standard deviation noisy gradient estimate for each of the plurality of model parameters (step 214). In particular, the system updates the standard deviation noisy gradient estimate for any given model parameter based on the mean estimate for the given model parameter and the privacy preserving noisy gradients for the given model parameter. More specifically, the system computes an exponential moving average using these quantities in order to determine the updated standard deviation noisy gradient estimate for the given model parameter.

To update the standard deviation noisy gradient estimate, the system first computes an initial updated estimate for the given model parameter that is bounded below by the predetermined minimum value for the standard deviation and bounded above by the predetermined maximum value for the standard deviation.

To compute the initial updated estimate, the system computes the difference between (i) a squared distance between the mean estimate for the given model parameter and the average privacy preserving noisy gradient for the given model parameter and (ii) the product of an auxiliary transformation parameter for the given model parameter (that is generated from the current noisy standard deviation estimate for the model parameter) used when clipping gradients and a noise scale used to apply noise to the clipped gradients.

The auxiliary transformation parameter for the given model parameter and the noise scale will be described in more detail below with reference to FIG. 3.

If the difference is not less than the predetermined minimum value for the standard deviation and not greater than the predetermined maximum value for the standard deviation, the system sets the initial updated estimate equal to the difference.

Alternatively, if the difference is less than the predetermined minimum value for the standard deviation, the system sets the initial updated estimate equal to the predetermined minimum value. Similarly, if the initial updated estimate is greater than the predetermined maximum value for the standard deviation, the system sets the initial updated estimate equal to the predetermined maximum value.

The system then computes the exponential moving average by interpolating between the square of the current standard deviation noisy gradient estimate and the initial updated estimate for the given model parameter, with the interpolation weights being governed by a standard deviation interpolation weight hyperparameter that defines how quickly the estimate changes during the training.

By repeatedly performing the process 200, the system repeatedly updates the model parameters, resulting in trained machine learning model that both preserves user privacy and performs well on the particular task for which the model is being trained.

Figure 3:
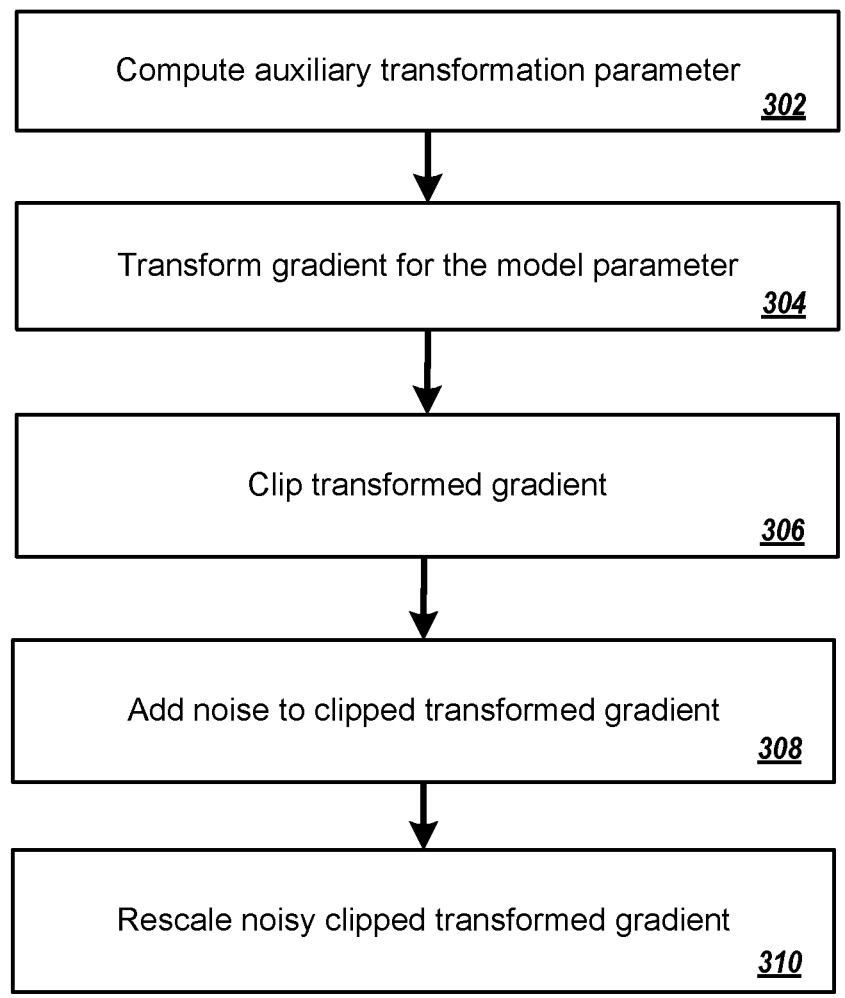
FIG. 3 is a flow diagram of an example process for determining a privacy preserving noisy gradient for a given model parameter.

FIG. 3 is a flow diagram of an example process 300 for determining a privacy preserving noisy gradient for a given model parameter. For convenience, the process 300 will be described as being performed by a system of one or more computers located in one or more locations. For example, a model training system, e.g., the model training system 100 of FIG. 1, appropriately programmed, can perform the process 300.

The system can perform the process 300 for each model parameter of the machine learning model to generate a respective privacy preserving noisy gradient for each of the model parameters.

The system computes an auxiliary transformation parameter for the model parameter from the standard deviation noisy gradient estimate for the given model parameter (step 302).

In particular, the auxiliary transformation parameter $b_i^t$ for the model parameter i at iteration t of the process 200, i.e., the t-th training step, is equal to or, more generally, directly proportional to:

$$\sqrt{s_i^t} \times \sqrt{\sum_{i=1}^d s_i^t},$$

where $s_i^t$ is the standard deviation noisy gradient estimate for the model parameter i and d is the total number of model parameters.

The system transforms the gradient for the given model parameter based on the mean noisy gradient estimate for the model parameter and the auxiliary transformation parameter for the model parameter to generate a transformed gradient (step 304). In particular, the system subtracts the mean noisy gradient estimate for the model parameter from the gradient for the model parameter to generate a difference and divides the difference by the auxiliary transformation parameter to generate the transformed gradient.

The system clips the transformed gradient for the given model parameter such that a vector of the transformed gradients, i.e., a vector that includes the transformed gradients for all of the model parameters, has no greater than a fixed norm, e.g., 1, to generate clipped transformed gradients (step 306). In particular, if the norm of the gradient vector exceeds 1, the system divides each transformed gradient by the norm to generate a corresponding clipped transformed gradient. This results in a vector of the clipped transformed gradients having norm 1. If the norm of the gradient vector does not exceed 1, the system does not modify the transformed gradients and sets the clipped transformed gradients equal to the transformed gradients.

The clipping scheme described above is both coordinate-wise, i.e., per-parameter, and adaptive. That is, because before clipping is applied the system generates transformed gradients using respective mean and standard deviation estimates that can differ between model parameters, the clipping is coordinate-wise. Because, as described above, the mean and standard deviation estimates are updated throughout training, the clipping is adaptive, i.e., the clipping scheme is not fixed prior to training.

The system then adds noise to the transformed gradient to generate a noisy clipped transformed gradient for the given model parameter (step 308). In particular, the system can sample, for each model parameter, a respective noise value from a noise distribution that is defined by a noise scale value and then add the sampled noise value to the clipped transformed gradient for the model parameter to generate the noisy clipped transformed gradient. The noise distribution can be, e.g., a Normal distribution with zero mean and a standard deviation equal to the noise scale value.

Because of the coordinate-wise, i.e., per-parameter, and adaptive clipping scheme, the system is able to add less noise to the gradient for each model parameter while still maintaining user privacy. In other words, the system can use a smaller noise scale value than other approaches while still maintaining user privacy. Adding less noise to the gradients results in more accurate model parameter updates and therefore reduces the training time required for training the model, results in a higher performing trained model, or both.

The system then rescales the noisy clipped transformed gradient based on the mean noisy gradient estimate for the given model parameter and the auxiliary transformation parameter for the model parameter to generate the privacy preserving gradient (step 310). In particular, to rescale the noisy clipped transformed gradient, the system multiplies the noisy clipped transformed gradient by the auxiliary transformation parameter to generate a product and adds the mean noisy gradient estimate for the model parameter to the product. This rescaling results in the privacy preserving gradient having the same scale as the original gradient, i.e., the gradient of the objective function with respect to the model parameters.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training of a machine learning model having a plurality of model parameters on user data from a plurality of users while preserving privacy of the user data, the method comprising:
   initializing a respective mean noisy gradient estimate for each of the plurality of model parameters;
   initializing a respective standard deviation noisy gradient estimate for each of the plurality of model parameters; and
   at each of a plurality of training steps:
      obtaining, over a data communication network, a plurality of training examples for the training step comprising data from a plurality of users; and
      training the machine learning model using the plurality of training examples for the training step, the training comprising:
         (i) updating the model parameters while preserving privacy of user data within the plurality of training examples using the respective mean noisy gradient estimate and the respective standard deviation noisy gradient estimate for each of the model parameters, and
         (ii) updating the respective mean noisy gradient estimate and the respective standard deviation noisy gradient estimate for each of the model parameters using the plurality of training examples, wherein updating the model parameters using the plurality of training examples comprises:
            for each of the plurality of training examples:
               generating, for the training example and for each of the plurality of model parameters, a respective gradient of an objective function for the training example with respect to the model parameter; and
               generating, for each of the plurality of model parameters, a respective privacy preserving noisy gradient for the training example that preserves privacy of user data contained within the training example by modifying the respective gradient for the model parameter for the training example based on (i) the mean noisy gradient estimate for the model parameter after being updated using privacy preserving noisy gradients with respect to the model parameter determined at a preceding training step and (ii) the standard deviation noisy gradient estimate for the model parameter after being updated using the mean noisy gradient estimate and the privacy preserving noisy gradients determined with respect to model parameter at the preceding training step, and
               wherein generating the respective privacy preserving noisy gradient comprises, for each model parameter:
                  transforming the gradient for the model parameter based on (i) the mean noisy gradient estimate for the model parameter and (ii) the standard deviation noisy gradient estimates for the plurality of model parameters to generate a transformed gradient; and
                  generating an adaptively clipped gradient, comprising clipping, to have a fixed norm, the transformed gradient for the model parameter that has been transformed using the respective mean and standard deviation noisy gradient estimates for the model parameter;
            generating, for each of the model parameters, a respective privacy preserving update for the model parameter for the training examples for the training step that preserves privacy of user data contained within the training examples for the training step from the privacy preserving noisy gradients for the model parameter for the plurality of training examples; and
         updating the model parameters with the privacy preserving updates;
         and wherein updating the respective mean noisy gradient estimate and the respective standard deviation noisy gradient estimate for each of the model parameters comprises, for each of the plurality of model parameters:
            updating, for use at a subsequent training step, the standard deviation noisy gradient estimate for the model parameter based on the mean estimate for the model parameter and the privacy preserving noisy gradients for the model parameter; and
            updating, for use at the subsequent training step, the mean noisy gradient estimate for the model parameter based on the privacy preserving noisy gradients for the model parameter.

2. The method of claim 1, further comprising:
   initializing the mean noisy gradient estimate for each of the model parameters to a fixed value.

3. The method of claim 1, further comprising:
   initializing the standard deviation noisy gradient estimate for each of the model parameters based on predetermined maximum and minimum values for a standard deviation of the noisy gradients for the model parameters.

4. The method of claim 1, further comprising:
   initializing the model parameters using a machine learning parameter initialization technique.

5. The method of claim 1, wherein updating the mean noisy gradient estimate for the model parameter based on the privacy preserving noisy gradients for the model parameter comprises:
   interpolating between the mean noisy gradient estimate and an average privacy preserving noisy gradient for the model parameter for the plurality of training examples in accordance with a mean interpolation weight hyperparameter.

6. The method of claim 1, wherein deriving, for each of the model parameters, a respective privacy preserving update for the model parameter for the training examples for the training step that preserves privacy of user data contained within the training examples for the training step from the privacy preserving noisy gradients for the model parameter for the plurality of training examples comprises:
computing an average noisy gradient for the model parameter from the privacy preserving noisy gradients for the model parameter for the plurality of training examples; and
applying a learning rate to the average noisy gradient for the model parameter to generate the privacy preserving update for the model parameter.

7. The method of claim 1, wherein updating the model parameters with the privacy preserving updates comprises:
for each model parameter, subtracting the privacy preserving update for the model parameter from the model parameter.

8. The method of claim 1, wherein deriving, for each of the plurality of model parameters, a respective privacy preserving noisy gradient for the training example that preserves privacy of user data contained within the training example further comprises:
adding noise to the adaptively clipped gradient.

9. The method of claim 1, wherein generating the transformed gradient for each of the plurality of model parameters comprises:
computing an auxiliary transformation parameter for the model parameter from the standard deviation noisy gradient estimate for the model parameter; and
transforming the gradient for the model parameter based on the mean noisy gradient estimate for the model parameter and the auxiliary transformation parameter for the model parameter to generate the transformed gradient.

10. The method of claim 9, wherein generating an adaptively clipped gradient further comprises:
after clipping the transformed gradient to have a fixed norm, adding noise to the transformed gradient to generate a noisy clipped transformed gradient.

11. The method of claim 10, wherein generating an adaptively clipped gradient further comprises:
rescaling the noisy clipped transformed gradient based on the mean noisy gradient estimate for the model parameter and the auxiliary transformation parameter for the model parameter to generate a transformed gradient.

12. The method of claim 9, wherein generating a transformed gradient further comprises:
subtracting the mean noisy gradient estimate for the model parameter from the gradient for the model parameter to generate a difference; and
dividing the difference by the auxiliary transformation parameter to generate the transformed gradient.

13. The method of claim 11, wherein rescaling the noisy clipped transformed gradient based on the mean noisy gradient estimate for the model parameter and the auxiliary transformation parameter for the model parameter comprises:
multiplying the noisy clipped transformed gradient by the auxiliary transformation parameter to generate a product; and
adding the mean noisy gradient estimate for the model parameter to the product.

14. The method of claim 9, wherein the auxiliary transformation parameter for the model parameter i is directly proportional to:

$$\sqrt{s_i^t} \times \sqrt{\Sigma_{i=1}^d s_i^t},$$

where $s_i^t$ is the standard deviation noisy gradient estimate for the model parameter i and d is the total number of model parameters.

15. The method of claim 9, wherein updating the standard deviation noisy gradient estimate for the model parameter based on the mean estimate for the model parameter and the privacy preserving noisy gradients for the model parameter comprises:
determining an initial updated estimate using the mean estimate for the model parameter and the privacy preserving noisy gradients for the model parameter; and
determining an interpolation between the standard deviation noisy gradient estimate and the initial updated estimate.

16. One or more non-transitory computer-readable storage media storing instructions that when executed by one or more computers cause the one or more computers to perform operations for training of a machine learning model having a plurality of model parameters on user data from a plurality of users while preserving privacy of the user data, the operations comprising:
initializing a respective mean noisy gradient estimate for each of the plurality of model parameters;
initializing a respective standard deviation noisy gradient estimate for each of the plurality of model parameters; and
at each of a plurality of training steps:
obtaining, over a data communication network, a plurality of training examples for the training step comprising data from a plurality of users; and
training the machine learning model using the plurality of training examples for the training step, the training comprising:
(i) updating the model parameters while preserving privacy of user data within the plurality of training examples using the respective mean noisy gradient estimate and the respective standard deviation noisy gradient estimate for each of the model parameters, and
(ii) updating the respective mean noisy gradient estimate and the respective standard deviation noisy gradient estimate for each of the model parameters using the plurality of training examples, wherein updating the model parameters using the plurality of training examples comprises:
for each of the plurality of training examples:
generating, for the training example and for each of the plurality of model parameters, a respective gradient of an objective function for the training example with respect to the model parameter; and
generating, for each of the plurality of model parameters, a respective privacy preserving noisy gradient for the training example that preserves privacy of user data contained within the training example by modifying the respective gradient for the model parameter for the training example based on (i) the mean noisy gradient estimate for the model parameter after being updated using privacy preserving noisy gradients with respect to the model parameter determined at a preceding training step and (ii) the standard deviation noisy gradient estimate for the model parameter after being updated using the mean noisy gradient estimate and the privacy preserving noisy gradients determined with respect to model parameter at the preceding training step, and wherein generating the respective privacy preserving noisy gradient comprises, for each model parameter:

transforming the gradient for the model parameter based on (i) the mean noisy gradient estimate for the model parameter and (ii) the standard deviation noisy gradient estimates for the plurality of model parameters to generate a transformed gradient; and generating an adaptively clipped gradient, comprising clipping, to have a fixed norm, the transformed gradient for the model parameter that has been transformed using the respective mean and standard deviation noisy gradient estimates for the model parameter;

generating, for each of the model parameters, a respective privacy preserving update for the model parameter for the training examples for the training step that preserves privacy of user data contained within the training examples for the training step from the privacy preserving noisy gradients for the model parameter for the plurality of training examples; and updating the model parameters with the privacy preserving updates;

and wherein updating the respective mean noisy gradient estimate and the respective standard deviation noisy gradient estimate for each of the model parameters comprises, for each of the plurality of model parameters:

updating, for use at a subsequent training step, the standard deviation noisy gradient estimate for the model parameter based on the mean estimate for the model parameter and the privacy preserving noisy gradients for the model parameter; and updating, for use at the subsequent training step, the mean noisy gradient estimate for the model parameter based on the privacy preserving noisy gradients for the model parameter.

17. A system comprising one or more computers and one or more storage devices storing instructions that when executed by the one or more computers cause the one or more computers to perform operations for training of a machine learning model having a plurality of model parameters on user data from a plurality of users while preserving privacy of the user data, the operations comprising:

initializing a respective mean noisy gradient estimate for each of the plurality of model parameters;

initializing a respective standard deviation noisy gradient estimate for each of the plurality of model parameters; and at each of a plurality of training steps:

obtaining, over a data communication network, a plurality of training examples for the training step comprising data from a plurality of users; and training the machine learning model using the plurality of training examples for the training step, the training comprising:

(i) updating the model parameters while preserving privacy of user data within the plurality of training examples using the respective mean noisy gradient estimate and the respective standard deviation noisy gradient estimate for each of the model parameters, and (ii) updating the respective mean noisy gradient estimate and the respective standard deviation noisy gradient estimate for each of the model parameters using the plurality of training examples, wherein updating the model parameters using the plurality of training examples comprises:

for each of the plurality of training examples:

generating, for the training example and for each of the plurality of model parameters, a respective gradient of an objective function for the training example with respect to the model parameter; and generating, for each of the plurality of model parameters, a respective privacy preserving noisy gradient for the training example that preserves privacy of user data contained within the training example by modifying the respective gradient for the model parameter for the training example based on (i) the mean noisy gradient estimate for the model parameter after being updated using privacy preserving noisy gradients with respect to the model parameter determined at a preceding training step and (ii) the standard deviation noisy gradient estimate for the model parameter after being updated using the mean noisy gradient estimate and the privacy preserving noisy gradients determined with respect to model parameter at the preceding training step, and wherein generating the respective privacy preserving noisy gradient comprises, for each model parameter:

transforming the gradient for the model parameter based on (i) the mean noisy gradient estimate for the model parameter and (ii) the standard deviation noisy gradient estimates for the plurality of model parameters to generate a transformed gradient; and generating an adaptively clipped gradient, comprising clipping, to have a fixed norm, the transformed gradient for the model parameter that has been transformed using the respective mean and standard deviation noisy gradient estimates for the model parameter;

generating, for each of the model parameters, a respective privacy preserving update for the model parameter for the training examples for the training step that preserves privacy of user data contained within the training examples for the training step from the privacy preserving noisy gradients for the model parameter for the plurality of training examples; and updating the model parameters with the privacy preserving updates;

and wherein updating the respective mean noisy gradient estimate and the respective standard deviation noisy gradient estimate for each of the model parameters comprises, for each of the plurality of model parameters:

updating, for use at a subsequent training step, the standard deviation noisy gradient estimate for the model parameter based on the mean estimate for the model parameter and the privacy preserving noisy gradients for the model parameter; and updating, for use at the subsequent training step, the mean noisy gradient estimate for the model parameter based on the privacy preserving noisy gradients for the model parameter.

18. The system of claim 17, wherein generating the transformed gradient for each of the plurality of model parameters comprises:

computing an auxiliary transformation parameter for the model parameter from the standard deviation noisy gradient estimate for the model parameter; and transforming the gradient for the model parameter based on the mean noisy gradient estimate for the model parameter and the auxiliary transformation parameter for the model parameter to generate a transformed gradient.

19. The system of claim 18, wherein generating an adaptively clipped gradient further comprises:

after clipping the transformed gradient to have a fixed norm, adding noise to the transformed gradient to generate a noisy clipped transformed gradient.

20. The system of claim 19, wherein generating an adaptively clipped gradient further comprises:

rescaling the noisy clipped transformed gradient based on the mean noisy gradient estimate for the model parameter and the auxiliary transformation parameter for the model parameter to generate a transformed gradient.

* * * * *